US010925279B2

(12) United States Patent
Fowler

(10) Patent No.: US 10,925,279 B2
(45) Date of Patent: *Feb. 23, 2021

(54) PICKERING EMULSION FORMULATIONS

(75) Inventor: Jeffrey Fowler, Greensboro, NC (US)

(73) Assignee: Syngenta Participations AG, Basel (CH)

( * ) Notice: Subject to any disclaimer, the term of this patent is extended or adjusted under 35 U.S.C. 154(b) by 1400 days.

This patent is subject to a terminal disclaimer.

(21) Appl. No.: 12/439,692

(22) PCT Filed: Aug. 30, 2007

(86) PCT No.: PCT/US2007/077168
§ 371 (c)(1),
(2), (4) Date: May 21, 2010

(87) PCT Pub. No.: WO2008/030749
PCT Pub. Date: Mar. 13, 2008

(65) Prior Publication Data
US 2010/0234230 A1    Sep. 16, 2010

Related U.S. Application Data

(60) Provisional application No. 60/824,641, filed on Sep. 6, 2006.

(51) Int. Cl.
| | | |
|---|---|---|
| *A01N 25/02* | (2006.01) | |
| *A01N 43/10* | (2006.01) | |
| *A01N 37/34* | (2006.01) | |
| *A01N 37/18* | (2006.01) | |
| *A01N 43/66* | (2006.01) | |
| *A01N 43/54* | (2006.01) | |
| *A01N 43/653* | (2006.01) | |
| *A01N 25/04* | (2006.01) | |
| *A01N 57/20* | (2006.01) | |
| *A01N 37/22* | (2006.01) | |

(52) U.S. Cl.
CPC .............. *A01N 25/04* (2013.01); *A01N 37/22* (2013.01); *A01N 57/20* (2013.01)

(58) Field of Classification Search
None
See application file for complete search history.

(56) References Cited

U.S. PATENT DOCUMENTS

| | | | |
|---|---|---|---|
| 5,096,711 A | | 3/1992 | Dookhith et al. |
| 5,206,021 A | * | 4/1993 | Dookhith et al. ............ 424/405 |
| 5,674,514 A | | 10/1997 | Hasslin |
| 5,866,040 A | * | 2/1999 | Nakama ............... A61K 8/06 424/70.19 |
| 6,074,986 A | | 6/2000 | Mulqueen et al. |
| 6,083,878 A | * | 7/2000 | Brants et al. ............... 504/206 |
| 2006/0128569 A1 | | 6/2006 | Bell |
| 2006/0128718 A1 | * | 6/2006 | Fuchs et al. ............. 514/252.05 |

FOREIGN PATENT DOCUMENTS

| | | | | |
|---|---|---|---|---|
| DE | 102004035737 A1 | 3/2006 | | |
| EP | 0719086 | 3/1995 | | |
| WO | 96/28972 | 9/1996 | | |
| WO | 01/22814 | 4/2001 | | |
| WO | WO2004/017734 | * | 3/2004 | ............ A01N 25/28 |
| WO | WO2004/024722 | * | 3/2004 | ............ A01N 47/38 |
| WO | 2004/080178 | 9/2004 | | |
| WO | 2004096422 | 11/2004 | | |
| WO | 2005/089548 | 9/2005 | | |

OTHER PUBLICATIONS

Hartzler, Bob. Are All metolachlor products equal? Version 2.0. http://www.weeds.iastate.edu/mgmt/2004/stalwart2.shtml Feb. 5, 2004.*
Binks, B. P. "Particles as surfactants—similarities and differences" Current Opinion in Colloid and Interface Science, v. 7, 2002, pp. 21-41.*
Binks, B. P. et al. "Silica Particle-stabilized emulsions of silicone oil and water: aspects of emulsification" Langmuir, 2004, 20, 1130-1137.*
Schramm, Laurier L., "Emulsions, Foams, and Suspensions: Fundamentals and Applications"; Published Online: Mar. 29, 2006; Chapter 5, Colloid Stability, pp. 238-241.
European Patent Office, Third Party Observation, Application No./Patent No. 07841604.7-1454/2068624; sent Jul. 4, 2014.
European Patent Office, Third Party Observation, Application No./Patent No. 07841571.8-1454/2059123; sent Jul. 1, 2014.
De Smet et al., Ostwald Ripening of Alkane Emulsions in the Presence of Surfactant Micelles, Langmuir, 1999, 15: 6745-6754.

* cited by examiner

*Primary Examiner* — Erin E Hirt
(74) *Attorney, Agent, or Firm* — James Cueva

(57) ABSTRACT

The invention provides aqueous pesticidal concentrates comprising at least one colloidal solid, a dispersed emulsion phase comprising at least one substantially water-insoluble pesticidally active ingredient, which is either itself an oily liquid comprising the oil phase, is a solid but is dissolved in an oily liquid present in the oil phase, is a solid and is dispersed within the oil phase or is present as a colloidal solid adsorbed to the liquid-liquid interface between the continuous aqueous phase and the dispersed oil phase and at least one Ostwald ripening inhibitor.

16 Claims, No Drawings

PICKERING EMULSION FORMULATIONS

This application is a 371 of International Application No. PCT/US2007/077168 filed Aug. 30, 2007, which claims priority to U.S. 60/824,641 filed Sep. 6, 2006, the contents of which are incorporated herein by reference.

The present invention relates to aqueous pesticidal emulsions and to methods of using said emulsions to combat pests or as plant growth regulators. In particular, the present invention relates to solid-stabilized, oil-in-water emulsions comprising a continuous aqueous phase, a colloidal solid, and a disperse oil phase comprising at least one Ostwald ripening inhibitor and at least one pesticidally active ingredient, wherein the at least one pesticidally active ingredient can be a colloidal solid.

BACKGROUND OF THE INVENTION

Crop protection agents are often administered in the form of aqueous systems. Water-based formulations are obtained by dissolving, emulsifying and/or suspending pesticide technical materials in water. The efficient use of aqueous systems with certain crop protection agents, however, may be restricted due to their poor water-solubility. Aqueous systems containing liquid, substantially water-insoluble pesticide technical materials may be formulated as emulsions or suspoemulsion formulations comprising low molecular weight or polymeric surfactants either alone or in admixture. However, these formulation types can suffer from a variety of problems including droplet coalescence followed by phase separation under the influence of temperature variations or due to the presence of high electrolyte concentrations either in the formulation or in the medium used to dilute the formulation prior to spray application. The presence of an emulsified oil phase increases the risk of formulation failure due to the intrinsic instability of oil-in-water emulsions. Due to the relatively complex supply chain for crop protection agents, the formulations can be stored for long periods and may be subjected during storage and shipping to extreme temperature variations, high-shear and repetitive vibration patterns which can increase the likelihood of failure.

It may often be desirable to combine different agrochemicals to provide a single formulation taking advantage of the additive properties of each separate agrochemical and optionally an adjuvant or combination of adjuvants that provide optimum biological performance. In commercial practice it is often desired to minimize transportation and storage costs by using a formulation in which the concentration of the active agrochemical(s) in the formulation is as high as is practicable and in which any desired adjuvants are "built-in" to the formulation as opposed to being separately tank-mixed. The higher the concentration of the active agrochemical(s) however, the greater is the probability that the stability of the formulation may be disturbed and one or more components separate out.

In general, the separation of a component from an agrochemical formulation is highly undesirable, particularly when the formulation is sold in bulk containers. In these circumstances it is difficult to re-homogenize the formulation and to achieve even distribution of the components on dilution and spraying. Furthermore, the formulation must be stable in respect of storage for prolonged periods in both hot and cold climates. These factors present formidable problems to the formulator. The problems may be exacerbated still further if the formulation contains a water-soluble agrochemical electrolyte and a second agrochemical system which is substantially water-insoluble.

In order to achieve stable dispersion of one liquid in another, emulsions in the traditional sense require the addition of an interface-active substance (emulsifier). Emulsifiers have an amphiphilic molecular structure, consisting of a polar (hydrophilic) and a nonpolar (lipophilic) molecular moiety, which are spatially separate from one another. In simple emulsions, finely disperse droplets of one phase, surrounded by an emulsifier shell, (water droplets in W/O emulsions or lipid vesicles in O/W emulsions) are present in the second phase. Emulsifiers lower the interfacial tension between the phases by positioning themselves at the interface between two liquids. At the phase boundary, they form oil/water interfacial films, which prevent irreversible coalescence of the droplets. Emulsions are frequently stabilized using emulsifier mixtures.

In the early 1900s, Pickering prepared paraffin/water emulsions that were stabilized merely by the addition of various colloidal solids, such as basic copper sulphate, basic iron sulphate or other metal sulphates. This type of emulsion is thus also referred to as a Pickering emulsion. For this type of emulsion, Pickering postulated the following conditions:
(1) The solid particles are only suitable for stabilization if they are significantly smaller than the droplets of the inner phase and do not have a tendency to form agglomerates.
(2) An important property of an emulsion-stabilizing colloidal solid is also its wettability. In order to stabilize an O/W emulsion, the colloidal solid has, for example, to be more readily wettable by water than by oil.

The original forms of Pickering emulsions initially surfaced as undesired secondary effects in a variety of industrial processes, such as, for example, in secondary oil recovery, the extraction of bitumen from tar sand and other separation processes involving two immiscible liquids and fine, dispersed solid particles. These are generally W/O emulsions which are stabilized by mineral solids. Accordingly, investigation of corresponding systems, such as, for example, the oil/water/soot or oil/water/slate dust systems was initially the focus of research activity.

Basic experiments have shown that one characteristic of a Pickering emulsion is that the solid particles are arranged at the interface between the two liquid phases where they form, as it were, a mechanical barrier against the coalescence of the liquid droplets.

Pickering emulsions are encountered in various natural and industrial processes such as crude oil recovery, oil separation, cosmetic preparation, and waste water treatment.

Advantages of formulating pesticidal compositions as a Pickering emulsion include:
1. Stability of the emulsion to coalescence over a broad range of storage temperatures, e.g., from the freezing point (and often even stable through freeze-thaw cycles) up to at least 50° C. and normally 80° C. or higher.
2. Simplicity in that instead of a mixture of 2 or more emulsifiers selected from the 1000 or more commercial surfactants available, Pickering emulsions are formed from normally only 1 but occasionally 2 colloidal solids selected from the limited number of commercially practical options.
3. Stability of the emulsion to coalescence over a broad range of pH and electrolyte conditions, including where the high electrolyte concentration may be due to one of the active ingredients, e.g., Pickering emulsions typically do not coalesce or exhibit any oil separation when diluted into simple nitrogen or complex (e.g., sulfur mixture) fertilizers.

4. Pickering emulsions may slowly form sediment upon dilution, as do many other formulations, but they resuspend extremely easily and are therefore more convenient when left for example in a spray tank overnight without agitation.

A disadvantage of Pickering emulsions is that they can be susceptible to Ostwald ripening, whereby diffusion through the continuous phase and between the droplets of the disperse phase can lead to an increase in the median droplet diameter over time. This increase in droplet diameter increases the rate of separation of the disperse phase driven by density differences—either sedimentation or cream formation due to buoyancy. Ultimately this ripening can render the product unfit for use because for example it requires re-homogenization, or because the droplets are too coarse to remain dispersed in the spray tank prior to application to the target, or because the droplets are too large to give even distribution of the active ingredient when applied to the target. An object of the present invention is to overcome the limitations of Pickering emulsions while realizing their benefits for pesticidally active ingredients.

SUMMARY OF THE INVENTION

There is now provided pesticidal and/or plant growth regulating compositions comprising aqueous pesticidal emulsions and to methods of using said emulsions to combat pests or as plant growth regulators. In particular, the present invention relates to colloidal solid-stabilized, oil-in-water emulsions comprising a colloidal solid and a dispersed emulsion phase comprising an Ostwald ripening inhibitor and at least one pesticidally active ingredient which is either itself an oily liquid comprising the oil phase, is a solid but is dissolved in an oily liquid present in the oil phase, is a solid and is dispersed within the oil phase or is present as a colloidal solid adsorbed to the liquid-liquid interface between the continuous aqueous phase and the dispersed oil phase.

A method of using the compositions of the invention is provided for eliciting the pesticidal effect, such as a herbicidal effect, in a plant, by diluting the emulsions, if necessary, in a suitable volume of water and applying a pesticidally effective amount of the composition, for example by spraying, to a locus such as soil or foliage, or by incorporating into or coating materials, such as building materials or for treating hides, for example, in the leather tanning process.

These and other benefits will be evident from the detailed description that follows.

DETAILED DESCRIPTION OF THE INVENTION

The liquid pesticidal emulsion compositions of the present invention comprise (a) an aqueous continuous phase;
(b) at least one colloidal solid; and
(c) a dispersed oil emulsion phase comprising
  (i) at least one substantially water-insoluble pesticidally active ingredient, which is either itself an oily liquid comprising the oil phase, is a solid but is dissolved in an oily liquid present in the oil phase, is a solid and is dispersed within the oil phase or is present as a colloidal solid adsorbed to the liquid-liquid interface between the continuous aqueous phase and the dispersed oil phase; and
  (ii) at least one Ostwald ripening inhibitor soluble or miscible in the oil phase or which itself serves as the oil phase.

In the event that more than one water-insoluble pesticidally active ingredient is present in the compositions of the present invention, it is understood that each water-insoluble pesticidally active ingredient, independently, is either itself an oily liquid comprising the oil phase, is a solid but is dissolved in an oily liquid present in the oil phase, is a solid and is dispersed within the oil phase or is present as a colloidal solid adsorbed to the liquid-liquid interface between the continuous aqueous phase and the dispersed oil phase.

The pesticidally active compound may be any known in the art. The term "pesticidally active" refers to chemicals and biological compositions, such as those described herein, which are effective in killing, preventing, or controlling the growth of undesirable pests, such as, plants, insects, mice, microorganism, algae, fungi, bacteria, and the like. The term may also apply to compounds that control the growth of plants in a desired fashion (e.g., growth regulator), to a compound which mimics the natural systemic activated resistance response found in plant species (e.g., plant activator) or to a compound that reduces the phytotoxic response to a herbicide (e.g., safener). The pesticidally active ingredients are independently present in an amount that is biologically effective when the composition is diluted, if necessary, in a suitable volume of liquid carrier, e.g., water, and applied to the intended target, e.g, the foliage of a plant or locus thereof or incorporated into or coated onto materials, such as building materials or used for treating hides, for example, in the leather tanning process.

Dispersed in the aqueous phase is an organic emulsion containing a substantially water-insoluble pesticide or plant growth regulator, sometimes referred to herein for brevity as a "water-insoluble" active ingredient even if it has measurable solubility in water. This active ingredient preferably has a solubility in water at 20° C. not greater than about 5000 mg/l as measured at the pH of the aqueous phase of the pesticidal composition. It will be apparent to one skilled in the art that the solubility in water of some active ingredients depends on pH if they have a titratable acid or base functionality; specifically acids are more soluble above their pKa and bases are more soluble below their pKb. Thus acids may be rendered insoluble in water for the purposes of the present discussion if the aqueous phase is maintained at a pH close to or below their pKa, even if they may be more soluble than about 5000 mg/l at a higher pH. Especially preferred water-insoluble active ingredients useful in the present invention have a solubility in the aqueous phase at 20° C. not greater than about 2000 mg/l. In certain circumstances as described below the water-insoluble active ingredient can itself serve as the colloidal solid, in which case the solubility of the active ingredient must be below about 100 mg/l in both the aqueous and disperse phases. Depending on the nature of the Ostwald ripening inhibitor and/or the organic solvent, if present, in the formulation, stable Pickering emulsions may still be formed from pesticidally active ingredients having a solubility greater than 5000 mg/L.

The substantially water-insoluble pesticidally active ingredient or a mixture of pesticidally active ingredients is/are liquid at ambient temperature or can be liquefied by warming, or can be dissolved in a suitable solvent, or can be dispersed as solids in a suitable water-immiscible liquid, or can be adsorbed to the liquid-liquid interface as a colloidal solid, and is/are substantially insoluble in water.

In an embodiment of the invention, the oil phase comprises a liquid with intermediate hydrophobicity so that it does not substantially dissolve or become miscible with water and is not so hydrophobic that the colloidal solids are unable to efficiently contact both the oil and water phases and thus remain at the interface. Preferably, the oil phase has an octanol-water partition coefficient (or log P) above 1 and below 7, preferably below 5.

In one embodiment, the oil droplets have a volume-weighted median diameter as measured by dynamic light scattering of 100 micron or less.

In the event that the substantially water-insoluble pesticidally active ingredient is a high viscosity liquid or a solid, solvents may be used to dissolve the substantially water-insoluble pesticidally active ingredient and form a low viscosity liquid.

The solvent must be substantially immiscible with water and the affinity of the solvent for the pesticidally active ingredient present in the disperse oil phase must be such that substantially all of the pesticidally active ingredient is partitioned in the oil phase and substantially none is partitioned in the aqueous phase. One skilled in the art will readily be able to determine whether a particular organic solvent meets this second criterion for the pesticidally active ingredient in question by following any standard test procedure for determining partition of a compound (in this case, the oil-soluble or miscible or oil-dispersed pesticidally active ingredient) between water and the organic solvent.

For example, one such test procedure comprises the following steps.
1. A solution of the oil-soluble or miscible pesticidally active ingredient is prepared in the organic solvent at as high a concentration as possible;
2. An aliquot of 10 g of this solution is added to 90 g water in a glass bottle, which is shaken on a mechanical shaker for 4 hours at ambient temperature;
3. The contents of the glass bottle are permitted to phase separate for 4 days;
4. Subsamples of the resulting oil and water phases are taken and analyzed by HPLC to determine concentrations $C_O$ and $C_W$ in the oil and water phases respectively. The subsample of the water phase is preferably centrifuged before analysis to remove traces of organic solvent; and
5. A partition coefficient, analogous to octanol-water partition coefficient P, is calculated as $C_O/C_W$. The partition coefficient is conveniently expressed as a logarithm.

In some cases the concentration of the pesticidally active ingredient in the water phase will be below the detection limit of the HPLC method. In other cases, traces of the organic solvent are found in the water phase, even after centrifugation, so that the apparent concentration of oil-soluble or miscible or oil-dispersed pesticidally active ingredient observed in the water phase is misleadingly high. In such cases, a published value for solubility in water of the oil-soluble or miscible or oil-dispersed pesticidally active ingredient in question can be used in place of $C_W$ for calculation of the partition coefficient.

The organic solvent is selected such that the pesticidally active ingredient exhibits a partition coefficient such that $\log(C_O/C_W)$ is about 2 or greater, preferably about 3 or greater. Preferably the pesticidally active ingredient is soluble in the organic solvent by at least about 5% by weight, more preferably by at least about 10% by weight and most preferably by at least about 15% by weight. Generally, organic solvents having a higher solubility for the pesticidally active ingredient therein are more suitable, provided the organic solvent is substantially immiscible with water, i.e., the organic solvent(s) remains as a separate liquid phase from the aqueous phase at 20° C. when mixed at ratios between about 1:100 up to about 100:1.

Organic solvents useful in compositions of the present invention preferably have a flash point above about 35° C., more preferably above about 90° C., and are preferably not antagonistic to the biological effectiveness of any of the pesticidally active ingredients of the composition. Examples of suitable solvents for use in the present invention include petroleum derived solvents such as mineral oils, aromatic solvents and paraffins. Naphthalenic aromatic solvents such as Aromatic 100, Aromatic 150 or Aromatic 200, commercially available from Exxon Mobil Chemical of Houston, Tex. or Sure Sol 225, commercially available from Koch Specialty Chemical Co. of Houston, Tex.; and alkyl acetates with high solvency, such as Exxate™ 1000, also available from Exxon Mobil Chemical. Useful aromatic solvents include benzene, toluene, o-xylene, m-xylene, p-xylene, mesitylene, naphthalene, bis-(α-methylbenzyl)xylene, phenylxylene and combinations thereof. Other useful solvents include substituted aromatic solvents such as chlorobenzene or ortho-dichlorobenzene. Further solvents suitable for preparing the oil phase include alkyl ketones, methyl esters of fatty acids derived from fats and oils such as methyl oleate, n-octanol, alkyl phosphates such as tri-n-butyl phosphate or tri-2-ethylhexyl phosphate, fatty acid alkyl amides such as Agnique KE3658 available from Cognis of Cincinnati, Ohio or Hallcomid M-8-10 available from Stepan Chemical of Northfield Ill.

The water-insoluble pesticidally active ingredients may, themselves, comprise the oil phase, may be solubilized in a hydrophobic solvent to form the oil phase, may form the colloidal solid, and/or may be dispersed within the oil phase. Depending upon the solvent selected, an active ingredient may be solubilized or dispersed in the oil phase, or adsorbed to the interface between the oil and aqueous phases of the present invention.

The substantially water-insoluble pesticidally active ingredients having solubility in the aqueous phase at 20° C. of preferably not greater than about 5000 mg/L, more preferably not greater than about 2000 mg/L, and including plant growth regulators, herbicides, herbicide safeners, insecticides and fungicides, suitable for use in the present invention include:

A. pesticidally active ingredients that below about 20° C. are liquids or that remain stable for at least several days as liquids and which themselves comprise the oil phase alone, or are used in combination with an organic solvent substantially immiscible with the aqueous phase. Examples of pesticidally active ingredients of this type include, but are not limited to, mefenoxam, metalaxyl, metolachlor, S-metolachlor, permethrin and propiconazole;

B. pesticidally active ingredients that have melting points between about 20° C. and about 80° C. that can be melted and then formed into an emulsion. Examples of pesticidally active ingredients of this type include, but are not limited to, cyprodinil, lambda cyhalothrin and myclobutanil;

C. solid pesticidally active ingredients that are soluble at 20° C. to a concentration of at least about 50,000 mg/L and more preferably at least about 150,000 mg/L in an organic solvent substantially immiscible with the aqueous phase. Examples of pesticidally active ingredients of this type include, but are not limited to, abamectin, clodinafop and lambda cyhalothrin;

D. solid pesticidally active ingredients that may be dispersed and retained within the oil phase include any pesticidally active ingredient having a melting point above about 50° C. and that have solubility at 20° C. of below about 5000 mg/L, more preferably below about 2000 mg/L, in the oil phase. Representative solid pesticidally active ingredients include chlorothalonil, isoxaflutole, mesotrione, including salts and chelates thereof, PPO inhibitors such as butafenacil, prodiamine, triazines such as atrazine, simazine and terbuthylazine, sulfonylurea herbicides such as primisulfuron, prosulfuron, azoxystrobin, fludioxonil, thiabendazole and a compound of the formula (I), described in U.S. Pat. No. 6,537,948:

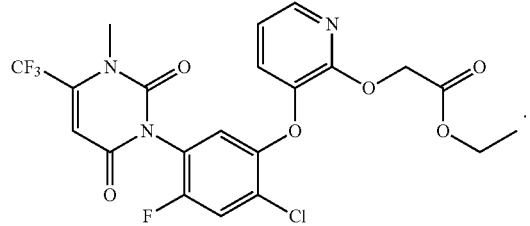

(I)

For purposes of this embodiment, solid pesticidally active ingredients include those active ingredients that substantially remain in solid form dispersed in the oil phase. The solid pesticidally active ingredients may exhibit limited solubility in a solvent present in the oil phase but not commercially useful levels of solubility in commercially useful solvents or which may be readily soluble in certain solvents, but which solvents either are not present in the oil phase or not present in an amount sufficient to solubilize a substantial portion of the active ingredient;

E. solid pesticidally active ingredients that may be adsorbed to the liquid-liquid interface between the continuous aqueous phase and the disperse oil phase, and thereby serve as colloidal solids to form the Pickering emulsion. Such solid active ingredients have solubility at 20° C. of below about 100 mg/L in both oil and aqueous phases present in the formulation.

Water-insoluble pesticidally active ingredients suitable for use in the present invention can readily be determined by one skilled in the art. The physical properties of the pesticidally active ingredient, such as water solubility and melting point, necessary to determine the suitability of an active ingredient in the present invention are well known and can be found in available publications such as The Pesticide Manual—14$^{th}$ Edition available from the British Crop Protection Council or readily determined by one of ordinary skill.

Substantially water-insoluble pesticidally active ingredients suitable for use in the present invention include, but are not limited to, fungicides such as azoxystrobin, chlorothalonil, cyprodinil, difenoconazole, fludioxonil, mandipropamid, picoxystrobin, propiconazole, pyraclostrobin, tebuconazole, thiabendazole and trifloxystrobin; herbicides such as acetochlor, alachlor, ametryn, amidosulfuron, anilofos, atrazine, azafenidin, azimsulfuron, benfluralin, benfuresate, bensulfuron-methyl, bensulide, benzfendizone, benzofenap, bromobutide, bromofenoxim, bromoxynil, butachlor, butafenacil, butamifos, butralin, butylate, cafenstrole, carbetamide, chlorbromuron, chloridazon, chlorimuron-ethyl, chlorotoluron, chlorpropham, chlorthal-dimethyl, chlorthiamid, cinidon-ethyl, cinmethylin, cinosulfuron, clodinafop-propargyl, clomazone, clomeprop, cloransulam-methyl, cyanazine, cycloate, cyclosulfamuron, daimuron, desmedipham, desmetryn, dichlobenil, diflufenican, dimefuron, dimepiperate, dimethachlor, dimethametryn, dimethenamid, dimethenamid-P, dinitramine, dinoterb, diphenamid, dithiopyr, diuron, EPTC, esprocarb, ethalfluralin, ethametsulfuron-methyl, ethofumesate, etobenzanid, fenoxaprop-ethyl, fenoxaprop-P-ethyl, fentrazamide, fenuron, flampropmethyl, flamprop-M-isopropyl, flazasulfuron, fluazolate, fluchloralin, flufenacet, flumiclorac-pentyl, flumioxazin, fluometuron, fluorochloridone, flupoxam, flurenol, fluridone, flurtamone, fluthiacet-methyl, halosulfuron-methyl, imazosulfuron, indanofan, isoproturon, isouron, isoxaben, isoxaflutole, lenacil, linuron, mefenacet, mesotrione, metamitron, metazachlor, methabenzthiazuron, methyldymron, metobenzuron, metobromuron, metolachlor, metosulam, metoxuron, metribuzin, metsulfuron-methyl, molinate, monolinuron, naproanilide, napropamide, neburon, norflurazon, orbencarb, oryzalin, oxadiargyl, oxadiazon, oxasulfuron, oxyfluorfen, pebulate, pendimethalin, pentanochlor, pethoxamid, pentoxazone, phenmedipham, pinoxaden, piperophos, pretilachlor, primisulfuron, prodiamine, profluazol, prometon, prometryn, propachlor, propanil, propazine, propham, propisochlor, propyzamide, prosulfocarb, prosulfuron, pyraflufen-ethyl, pyrazogyl, pyrazolynate, pyrazosulfuron-ethyl, pyrazoxyfen, pyributicarb, pyridate, pyriminobac-methyl, quinclorac, siduron, simazine, simetryn, S-metolachlor sulcotrione, sulfentrazone, sulfometuron-methyl, sulfosulfuron, tebutam, tebuthiuron, terbacil, terbumeton, terbuthylazine, terbutryn, thenylchlor, thiazopyr, thidiazimin, thifensulfuron-methyl, thiobencarb, tiocarbazil, triallate, triasulfuron, tribenuron-methyl, trietazine, trifluralin, triflusulfuron-methyl and vernolate; herbicide safeners such as benoxacor, cloquintocet, cloquintocet-mexyl, dichlormid, fenchlorazole-ethyl, fenclorim, flurazole, fluxofenim, furilazole, isoxadifen-ethyl, mefenpyr; alkali metal, alkaline earth metal, sulfonium or ammonium cation of mefenpyr; mefenpyr-diethyl and oxabetrinil; insecticides such as abamectin, clothianidin, emamectin benzoate, gamma cyhalothrin, imidacloprid, lambda cyhalothrin, permethrin, resmethrin and thiamethoxam.

Preferred substantially water-insoluble pesticidally active ingredients include acetamide herbicides and safeners. Representative acetamide herbicides include diphenamid, napropamide, naproanilide, acetochlor, alachlor, butachlor, dimethachlor, dimethenamid, dimethenamid-P, fentrazamide, metazachlor, metolachlor, pethoxamid, pretilachlor, propachlor, propisochlor, S-metolachlor, thenylchlor, flufenacet and mefenacet. Where the acetamide herbicide is liquid at ambient temperatures, i.e., has a melting point below about 0° C., the oil phase can consist essentially or substantially of the acetamide herbicide itself. In other words, no organic solvent is necessary, although one can optionally be included. Examples of acetamide herbicides that are liquid at ambient temperatures and can be formulated in compositions of the invention without the need for an organic solvent include acetochlor, butachlor, dimethenamid, dimethenamid-P, metolachlor, S-metolachlor and pretilachlor. Where an organic solvent is desired or required, any suitable organic solvent known in the agricultural chemical formulating art in which the acetamide herbicide is adequately soluble can be used. Preferably the organic solvent is one in which the acetamide herbicide is highly soluble, so that as high as possible a concentration of the acetamide herbicide can be accommodated in the oil phase and in the composition as a whole.

As used herein, the term acetamide includes mixtures of the two or more acetamides as well as mixtures of optical isomers of the acetamides. For example, mixtures of the (R) and (S) isomers of metolachlor wherein the ratio of (S)-2-chloro-N-(2-ethyl-6-methylphenyl)-N-(2-methoxy-1-methylethyl)acetamide to (R)-2-chloro-N-(2-ethyl-6-methylphenyl)-N-(2-methoxy-1-methylethyl)acetamide is in the range of from 50-100% to 50-0%, preferably 70-100% to 30-0% and more preferably 80-100% to 20-0% are included.

Preferred acetamides include mixtures of metolachlor (S) and (R) isomers wherein the ratio of (S)-2-chloro-N-(2-ethyl-6-methylphenyl)-N-(2-methoxy-1-methylethyl)acetamide to (R)-2-chloro-N-(2-ethyl-6-methylphenyl)-N-(2-methoxy-1-methylethyl)acetamide is in the range of from 50-100% to 50-0%, preferably 70-100% to 30-0% and more preferably 80-100% to 20-0%.

Safeners suitable for use in the present invention include benoxacor; cloquintocet; cloquintocet-mexyl; dichlormid; fenchlorazole-ethyl; fenclorim; flurazole; fluxofenim; furilazole; isoxadifen-ethyl; mefenpyr; an alkali metal, alkaline earth metal, sulfonium or ammonium cation of mefenpyr; mefenpyr-diethyl and oxabetrinil. Preferred safeners include benoxacor and dichlormid. When a liquid acetamide is used the safener will generally be dissolved in the acetamide phase. However, an organic solvent can optionally be used. Where an organic solvent is desired or required, any suitable organic solvent known in the agricultural chemical formulating art in which the acetamide herbicide and safener are adequately soluble can be used. Preferably the organic solvent is one in which the acetamide herbicide and safener are highly soluble, so that as high as possible a concentration of the active components can be accommodated in the oil phase and in the composition as a whole.

Solids, such as silicas and clays, have been taught in the literature for use as viscosity modifiers in agrochemical formulations to inhibit gravity-driven sedimentation or cream separation by forming a network or gel throughout the continuous phase, thereby increasing the low-shear viscosity, and slowing the movement of small particles, surfactant micelles or emulsion droplets. The colloidal solids of the present invention instead stabilize the emulsion droplets of the dispersed oil emulsion phase by adsorbing to the liquid-liquid interface, thereby forming a barrier around the droplets so that contacting or neighboring droplets are not able to coalesce, irrespective of whether or not the emulsion droplets have collected in a sediment or a cream layer. It is possible to distinguish the two different functions—rheological modification or emulsion stabilization, by a functional test such as described below. The effectiveness of the colloidal solid in stabilizing the emulsions depends on particle size, particle shape, particle concentration, particle wettability and the interactions between particles. The colloidal solids must be small enough so that they can coat the surfaces of the oil droplets, sufficiently small for good dispersion stability against sedimentation when diluted for use and small enough to provide an even product distribution at the target site. The colloidal solid must have sufficient affinity for both the liquids forming the disperse and continuous phases that they are able to adsorb to the liquid-liquid interface and thereby stabilize the emulsion. This wetting characteristic, particle shape and suitability for Pickering emulsion stabilization may be readily assessed in formulations of sufficiently low viscosity (below about 2000 centipoise) to be useful in most liquid products, by combining the two immiscible liquid phases and the colloidal solid, and providing sufficient mechanical agitation to form an emulsion. If the resulting emulsion exhibits no substantial droplet coalescence over a period of 2 or more hours, as determined by the growth of a liquid layer containing only the liquid that was earlier present in the disperse phase, then the colloidal solid has sufficient affinity for the liquid-liquid interface to stabilize the Pickering emulsion against coalescence. In some cases the affinity of the colloidal solid for the liquid-liquid interface can be increased, and the emulsion stability improved, by adding one or more water soluble electrolytes or non-electrolytes to the continuous aqueous phase. One skilled in the art can readily determine suitable electrolytes or non-electrolytes to achieve this result, and optimize for a suitable use concentration, by conventional experimental methods. Such compositions are also part of the present invention. It is also similarly possible to improve the affinity of the colloidal solid for the liquid-liquid interface by adding a co-solvent that partitions preferentially into the disperse phase, that is the co-solvent has a log P of greater than about 1, and similar experimental methods can readily determine a suitable co-solvent and use concentration. Such compositions are also part of the present invention.

In one embodiment, the colloidal solids have a number-weighted median particle size diameter as measured by scanning electron microscopy of 0.5 micron or less, preferably 0.1 micron or less, more preferably 0.05 micron or less.

A wide variety of solid materials may be used as colloidal stabilizers for the Pickering emulsions of the present invention including carbon black, metal oxides, metal hydroxides, metal carbonates, metal sulfates, polymers which are insoluble in any of the components present in the formulations, silica and clays. If a pesticidally active agent has suitably low solubility in both the continuous and disperse liquid phases, that is below about 100 ppm at room temperature, and can be prepared at a suitable particle size, and has suitable wetting properties for the liquid-liquid interface as described above, then it is also possible that this active ingredient can serve as the colloidal stabilizer. Specific examples of colloidal solids include zinc oxide, iron oxide, copper oxide, titanium dioxide, aluminum oxide, calcium carbonate, precipitated silica and fumed silica, as well as mixtures thereof. The solid may be surface modified, for example fumed or precipitated silica modified by the presence of dimethyldichlorosilane, hexadecylsilane, aluminum oxide or by alkane decoration. Polymers suitable for use as colloidal stabilizers in the present invention include polymers, including polymeric fibers, which have been modified so as to impart surface-active properties onto said fibers such as those taught in WO 2007/068344.

Ostwald ripening inhibitors, for use in the present invention, are soluble or miscible in the disperse oil phase, or themselves serve as the disperse oil phase containing the at least one substantially water-insoluble pesticidally active ingredient and/or having the active ingredient adsorbed to the liquid-liquid interface between the continuous aqueous phase and the dispersed oil phase as a colloidal solid. The Ostwald ripening inhibitors must have more affinity for the disperse oil phase than the continuous aqueous phase and preferably have a log P of 3 or higher. Suitable Ostwald ripening inhibitors include Ostwald ripening inhibitor solvents such as vegetable oils, methylated vegetable oils, mineral oils, liquid hydrocarbon solvents containing from 8 to 20 carbon atoms, petroleum hydrocarbons wherein 30 to 100 wt. % of the carbon structures of the hydrocarbons have a carbon number distribution in the range of $C_{22}$ to $C_{50}$ and polymeric stabilizers as described below. The Ostwald ripening inhibitor solvents must have very low solubility, preferably below 100 ppm at 50° C. in the aqueous phase, in order to remain in the disperse oil phase and not dissolve in the continuous aqueous phase.

Liquid, hydrocarbon solvents suitable for use as Ostwald ripening inhibitors of the present invention include paraffins, naphthenes and aromatics either as mixtures or as individual components.

Preferred hydrocarbon solvents contain greater than 50 wt. % paraffins. Preferably, at least 95 wt. %, more preferably at least 98 wt. %, of the carbon structures of the hydrocarbon solvents have a carbon number distribution from $C_{10}$ to $C_{20}$. Preferred hydrocarbon solvents have an initial boiling point of at least 200° C., preferably at least 250° C. and a final boiling point of 325° C. or less.

Particularly preferred hydrocarbon solvents for use as the Ostwald ripening inhibitors of the present invention are tetradecane, hexadecane, iso-paraffin fluids such as Isopar™ V, hydrocarbon fluids having a high normal paraffin content such as Norpar™ 15 and high aromatic content fluids such as Aromatic 200 all available from ExxonMobil Chemical Company.

Ostwald ripening inhibitors suitable for use in the present invention further include petroleum hydrocarbon fluids wherein 30 to 100 wt. % of the carbon structures of the hydrocarbon fluids have a carbon number distribution in the range of $C_{22}$ to $C_{50}$. Preferred petroleum hydrocarbon fluids are paraffin oils derived from the refined fraction of petroleum oil with a distillation range at 10 mm Hg of about 190° C. to 280° C. (according to ASTM D1160) and more preferably about 200° C. to 270° C., wherein at least 95 wt. % of the carbon structures of the hydrocarbon fluids have a carbon number distribution from about $C_{13}$ to about $C_{55}$, preferably from about $C_{15}$ to about $C_{50}$. In a preferred embodiment, 30 to 100 wt. % of the carbon structures of the paraffin oils have a carbon number distribution in the range of $C_{22}$ to $C_{50}$.

Polymeric stabilizers suitable for use as the Ostwald ripening inhibitors in the practice of the invention include those polymers set forth in U.S. Pat. Nos. 5,674,514 and 6,074,986, the contents of which are incorporated herein by reference, which are soluble in the oil phase and have little or no solubility in the aqueous phase. There is no particular minimum or maximum molecular weight limitation to the polymer Ostwald ripening inhibitors of the present invention as long as the polymer meets the solubility criteria herein described. The polymeric stabilizers include those polymers which are substantially insoluble in water, essentially stable to hydrolysis, and dissolve in the pesticide or pesticide mixture or in a solution of at least one pesticide in a hydrophobic solvent.

Examples of polymeric stabilizing materials for as Ostwald ripening inhibitors of the invention are polymers or oligomers having a molecular weight of at least 200, preferably a molecular weight of at least 400. The chemical composition of the material can be selected based on its ability to be solubilized in the dispersed phase. Suitable materials may be homopolymers or co-polymers, for example those described in "Polymer Handbook" 3rd Edition edited by J. Brandrup and E. H. Immergut. Examples of suitable homopolymers include polyolefins such as polyallene, polybutadiene, polyisoprene, and poly(substituted butadienes) such as poly(2-t-butyl-1,3-butadiene), poly(2-chlorobutadiene), poly(2-chloromethyl butadiene), polyphenylacetylene, polyethylene, chlorinated polyethylene, polypropylene, polybutene, polyisobutene, polybutylene oxides, or copolymers of polybutylene oxides with propylene oxide or ethylene oxide, polycyclopentylethylene, polycyclohexylethylene, polyacrylates including polyalkylacrylates and polyarylacrylates, polymethacrylates including polyalkylmethacrylates and polyarylmethacrylates, polydisubstituted esters such as poly(di-n-butylitaconate), and poly(amylfumarate), polyvinylethers such as poly(butoxyethylene) and poly(benzyloxyethylene), poly(methyl isopropenyl ketone), polyvinyl chloride, polyvinyl acetate, polyvinyl carboxylate esters such as polyvinyl propionate, polyvinyl butyrate, polyvinyl caprylate, polyvinyl laurate, polyvinyl stearate, polyvinyl benzoate, polystyrene, poly-t-butyl styrene, poly(substituted styrene), poly(biphenyl ethylene), poly(1,3-cyclohexadiene), polycyclopentadiene, polyoxypropylene, polyoxytetramethylene, polycarbonates such as poly(oxycarbonyloxyhexamethylene), polysiloxanes, in particular, polydimethyl cyclosiloxanes and organo-soluble substituted polydimethyl siloxanes such as alkyl, alkoxy, or ester substituted polydimethylsiloxanes, liquid polysulfides, natural rubber and hydrochlorinated rubber, ethvi-, butyl- and benzyl-celluloses, cellulose esters such as cellulose tributyrate, cellulose tricaprylate and cellulose tristearate and natural resins such as colophony, copal and shellac.

Examples of suitable co-polymers are co-polymers of styrene, alkyl styrenes, isoprene, butenes, butadiene, acrylonitrile, alkyl acrylates, alkyl methacrylates, vinyl chloride, vinylidene chloride, vinyl esters of lower carboxylic acids and alpha, beta-ethylenically unsaturated carboxylic acids and esters thereof, including co-polymers containing three or more different monomer species therein.

Preferred stabilizers are polystyrenes, polybutenes, for example polyisobutenes, polybutadienes, polypropylene glycol, polyalkyl(meth)acrylate e.g. polyisobutylacrylate or polyoctadecylmethacrylate, polyvinylesters e.g. polyvinylstearate, polystyrene/ethyl hexylacrylate copolymer, and polyvinylchloride, polydimethyl cyclosiloxanes, organic soluble substituted polydimethyl siloxanes such as alkyl, alkoxy or ester substituted polydimethylsiloxanes, and polybutylene oxides or copolymers of polybutylene oxides with propylene and/or ethylene oxide.

Preferably, the polymeric stabilizer comprises at least one polymer selected from the group consisting of polypropylene, polyisobutylene, polyisoprene, copolymers of monoolefins and diolefins, polyacrylate, polystyrene, polyvinyl acetate, polyurethanes and polyamides. Preferred polymeric stabilizers include polystyrene such as Styron® 6,6,6-D available from Dow Chemical Company.

The stabilizer is generally used as a pre-prepared polymer or oligomer. In an alternative embodiment however, the stabilizer may be prepared in situ by polymerization of one or more appropriate monomers within the non-aqueous phase, after preparation of the dispersion.

The Ostwald ripening inhibitor solvents and polymeric stabilizers may be employed in an amount of from 0.1 to 20%, preferably from 0.2 to 6% by weight of the disperse phase. Mixtures of stabilizers may be employed.

The type and amount of colloidal solid and Ostwald ripening inhibitor is selected so as to provide acceptable physical stability of the composition. This can readily be determined by one of skill in the art by routine evaluation of a range of compositions having different amounts of these components. Typically, physical stability of the composition is acceptable if no significant coalescence is evident following storage for at least 7 days over the range of temperatures from 0° C. to about 50° C. Stable compositions within the scope of the present invention also include those compositions which can easily be resuspended or redispersed with only a minor amount of agitation.

In one embodiment, the continuous phase of the liquid pesticidal emulsion compositions comprises at least one water-soluble agrochemical. Preferably, the water-soluble agrochemical is an agrochemical electrolyte.

In general, the separation of a component from an agrochemical formulation is highly undesirable, particularly when the formulation is sold in bulk containers. In these circumstances it may be difficult to re-homogenize the formulation and to achieve even distribution of the components on dilution and spraying. Furthermore, the formulation must be stable in respect of storage for prolonged periods in both hot and cold climates. These factors present formidable problems to the formulator. The problems may be exacerbated still further if the formulation contains a water-soluble agrochemical electrolyte and a second agrochemical system which is a substantially water-insoluble liquid or solid. The formulations of the present invention provide for stable oil-in-water emulsions even when the aqueous phase contains an agrochemical electrolyte.

The water-soluble agrochemical electrolyte may be an active agrochemical or an agrochemical enhancer such as ammonium sulfate or any other ionic species added to a chemical formulation. The term "agrochemical" includes compounds which possess biological activity, for example herbicides, plant growth regulators, algicides, fungicides, bactericides, viricides, insecticides, acaricides, nematicides or molluscicides. Suitable agrochemical actives which are water-soluble include acifluorfen, acrolein, aminopyralid, amitrole, asulam, benazolin, bentazone, bialaphos, bromacil, bromoxynil-potassium, chloramben, chloroacetic acid, clopyralid, 2,4-D, 2,4-DB, dalapon, dicamba, dichlorprop difenzoquat, diquat, endothall, fenac, fenoxaprop, flamprop, flumiclorac, fluoroglycofen, flupropanate, fomesafen, fosamine, glufosinate, glyphosate, imidazolinones such as imazameth, imazamethabenz, imazamox, imazapic, imazapyr, imazaquin and imazethapyr, ioxynil, MCPA, MCPB, mecoprop, methylarsonic acid, naptalam, nonanoic acid, paraquat, picloram, quinclorac, sulfamic acid, 2,3,6-TBA, triclopyr and water-soluble salts thereof. Preferred agrochemicals include glyphosate (N-phosphonomethylglycine), which is commonly used in the form of its water-soluble salts such as potassium, trimethylsulphonium, isopropylamine, sodium, or ammonium salts, salts of diquat, for example diquat dibromide, fomesafen which is commonly used in the form of its water-soluble sodium salt, glufosinate which is commonly used in the form of its water-soluble ammonium salt, paraquat dichloride, dicamba which is commonly used in the form if its sodium or potassium or dimethylammonium salts, and bentazone which is commonly used in the form of its water-soluble sodium salt. Representative agrochemical enhancers include ammonium nitrate, ammonium sulfate, sodium chloride and sodium acetate. While these components, alone, may not be pesticidally active they may be present to enhance the biological efficacy of the pesticide, to reduce the corrosion potential, to lower the freezing point, and/or to enhance the physical stability of the compositions. Thus for example glyphosate salts may be formulated or tank-mixed with ammonium sulfate as an activity enhancer, whilst magnesium sulfate may be added to paraquat as a purgative. Mixtures of water-soluble agrochemical electrolytes may also be used. Preferred mixtures include mixtures of glyphosate salts with at least one member selected from the group consisting of dicamba, diquat, glufosinate and paraquat.

The term "water-soluble" in relation to a pesticide or plant growth regulator or a salt thereof as used herein means having a solubility in deionized water at 20° C. sufficient to enable the water-soluble agrochemical electrolyte to be dissolved completely in the aqueous phase of a composition of the invention at the desired concentration. Preferred water-soluble active ingredients useful in the present invention have a solubility in deionized water at 20° C. of not less than about 50,000 mg/l, more preferably not less than about 100,000 mg/l. Where an active ingredient compound is referred to herein as being water-soluble, but the compound itself is known not to be water-soluble as defined immediately above, it will be understood that the reference applies to water-soluble derivatives, more particularly water-soluble salts, of the compound.

The water-soluble agrochemical electrolyte, for example a herbicide, when present is at a concentration in the composition as a whole sufficient, upon dilution of the composition in a suitable volume of water, if required, and applied by spraying to the target locus, to be pesticidally, for example herbicidally, effective. In a concentrate composition it is desirable to provide as high a concentration, or "loading", of the water-soluble active ingredient as is possible and convenient. Depending on the active ingredient in question and the intended use of the composition, a loading of about 50,000 to about 560,000 mg/l or higher is preferred.

Preferably, the water-soluble agrochemical electrolyte comprises at least one member selected from the group consisting of ammonium sulfate, magnesium sulfate, dicamba, diquat, glufosinate, glyphosate, paraquat and agriculturally acceptable salts thereof. In a particular embodiment, the water-soluble agrochemical electrolyte comprises an agriculturally acceptable salt of the herbicide glyphosate.

Although glyphosate has three acid sites, and can therefore form tribasic salts, preferred compositions have an aqueous phase whose pH is not greater than about 8, at which pH value the fraction of glyphosate existing as a tribasic salt is negligibly small. Only the two acid sites that are significantly deprotonated at pH 8 are therefore considered herein. One of these is on the phosphonate moiety, and the other is on the carboxylate moiety, of the glyphosate molecule. Dibasic salts, particularly the diammonium salt, of glyphosate are useful in compositions of the invention, but monobasic salts are also preferred. Particularly preferred examples include the monosodium, monopotassium, mono (dimethylammonium), mono(ethanolammonium), mono (isopropylammonium) and mono(trimethylsulfonium) salts. Glyphosate a.e. loadings of about 110 to about 560 g/l (about 110,000 to about 560,000 mg a.e./l) are achievable; loadings in a range from about 180 to about 500 g a.e./l (about 180,000 to about 500,000 mg a.e./l) are found to be especially useful.

An object of the invention is a process for preparing aqueous emulsions as herein described, wherein an Ostwald ripening inhibitor is solubilized in the liquid, substantially water-insoluble pesticide, optionally by warming, and this solution is emulsified within an aqueous solution comprising water, colloidal solids and optionally a soluble salt.

Further aspects of the invention include a method of preventing or combatting infestation of plant species or animals by pests, and regulating plant growth by diluting an amount of emulsion composition with a suitable liquid carrier, such as water or liquid fertilizer, and applying to the plant, tree, animal or locus as desired.

The emulsion can be stored conveniently in a container from which it is poured, or pumped, or into which a liquid carrier is added prior to application.

The advantages of the emulsions of the present invention include: storage-stability for extended periods, for example 6 months or longer at room temperature; simple handling is made possible for users because dilution is made with water, or other liquid carrier, for preparation of application mixtures; negligible change in emulsion droplet size during storage or on dilution; the compositions can easily be resuspended or redispersed with only a minor amount of agitation and/or the emulsions are not susceptible to coalescence when dilution is made with fertilizer solutions for preparation of application mixtures.

The present invention provides excellent flexibility in the incorporation of the substantially water-insoluble pesticidally active ingredient and it will generally be possible to include a wide range of proportions depending on the desired combined agrochemical effect. Thus the proportions may typically be from 150 parts by weight of agrochemical electrolyte to 1 part by weight of the substantially water-insoluble pesticidally active ingredient(s) through to 1 part by weight of agrochemical electrolyte to 4 parts by weight of the substantially water-insoluble pesticidally active ingredient(s). The upper limit of the content of the substantially water-insoluble pesticidally active ingredient(s) is determined only by the proportion that can be effectively dispersed.

Thus according to a further aspect of the present invention wherein the agrochemical electrolyte is a herbicide, there is provided a process of severely damaging or killing unwanted plants which comprises applying to the plants a herbicidally effective amount of a composition of the present invention.

The rate of application of the composition of the invention will depend on a number of factors including, for example, the active ingredients chosen for use, the identity of the plants whose growth is to be inhibited and the formulations selected for use and whether the compound is to be applied for foliage or root uptake. As a general guide, however, an application rate of from 0.001 to 20 kilograms per hectare is suitable while from 0.025 to 10 kilograms per hectare may be preferred.

In one embodiment of the present invention, the compositions further comprise a water-insoluble pesticidally active ingredient in the form of a dispersed solid phase and this solid phase is dispersed within a water-immiscible solvent that is itself dispersed within an aqueous phase, thus forming a solid-in-oil emulsion, said oil emulsion itself being stabilized by colloidal solids as described above.

If a water-insoluble solid pesticidally active material is present, the solid active ingredient may be milled to the desired particle size. Milling a slurry of the active material with water, defoamer, and water soluble surfactants, as necessary, may be used to achieve the desired particle size. The particle size may be an average particle size of about 0.2 to about 20 microns, preferably about 0.2 to about 15 microns, more preferably about 0.2 to about 10 microns.

The solid, water-insoluble active ingredient will typically have a melting point not less than about 50° C., preferably not less than about 75° C. Especially preferred water-insoluble active ingredients useful in the present invention have a melting point not less than about 100° C., even more preferably not less than about 150° C.

As used herein, the term "pesticidally effective amount" means the amount of pesticide compound which adversely controls or modifies the pests. For example, in the case of herbicides, a "herbicidally effective amount" is that amount of herbicide sufficient for controlling or modifying plant growth. Controlling or modifying effects include all deviation from natural development, for example, killing, retardation, leaf burn, albinism, dwarfing and the like. The term plants refers to all physical parts of a plant, including seeds, seedlings, saplings, roots, tubers, stems, stalks, foliage and fruits. In the case of fungicides, the term "fungicide" shall mean a material that kills or materially inhibits the growth, proliferation, division, reproduction, or spread of fungi. As used herein, the term "fungicidally effective amount" or "amount effective to control or reduce fungi" in relation to the fungicidal compound is that amount that will kill or materially inhibit the growth, proliferation, division, reproduction, or spread of a significant number of fungi. As used herein, the terms "insecticide", "nematicide" or "acaracide" shall mean a material that kills or materially inhibits the growth, proliferation, reproduction, or spread of insects, nematodes or acarids, respectively. An "effective amount" of the insecticide, nematicide or acaricide is that amount that will kill or materially inhibit the growth, proliferation, reproduction or spread of a significant number of insects, nematodes or acarides.

The selection of application rates relative to providing a desired level of pesticidal activity for a composition of the invention is routine for one of ordinary skill in the art. Application rates will depend on factors such as plant conditions, weather and growing conditions as well as the activity of the pesticidally active ingredients and any applicable label rate restrictions.

In the compositions of the present invention, typically there is no need for the presence of conventional emulsifiers in the form of low molecular weight or polymeric surfactants. If used, the emulsifiers are present in an amount of at most 0.5% by weight. According to the invention, it is particularly advantageous if the preparations comprise significantly less than 0.5% by weight of one or more emulsifiers or are even entirely free from emulsifiers. However, surfactants may be present at higher levels if they are necessary as adjuvants to maximize the biological efficacy of the pesticide(s). In this case the performance of the colloidal solids to stabilize the emulsion can be simply verified by performing one of two tests as described below.

Either a test sample may be prepared with the colloidal solid but without the adjuvant, and it can be confirmed that the emulsion is stable and does not exhibit coalescence. Alternatively a test sample may be prepared with the adjuvant but without the colloidal solid, and it can be confirmed that the emulsion is unstable and that the oil phase coalesces within less than about one hour. Coalescence is apparent by the formation of large oil droplets visible to the eye, and ultimately by the formation of a layer of oil within the formulation. A quantitative test for coalescence has been described by Kato et al. based on measuring conductivity [J. Food Sci., 50(1), 56 (1985)]. Physical stability of the composition is acceptable if no significant coalescence is evident following storage for at least 7 days over the range of temperatures from 0° C. to about 50° C. Stable compositions within the scope of the present invention also include those compositions that can easily be resuspended or redispersed with only a minor amount of agitation—in such cases the formulation is exhibiting creaming or sedimentation, as described by T. F. Tadros [Surfactants in Agrochemicals, Marcel Dekker, New York (1995)].

At a high volume fraction of oil phase small amounts of polymeric dispersants can eliminate a tendency for the material to show increasing viscosity and yield stress over time. In an embodiment of the invention, polyacrylic acid or derivatives of polyacrylic acid in an amount of 0.01 to 0.5%, preferably 0.05 to 0.2%, wt/wt are present in the emulsions.

Also suitable are polymers or copolymers of vinyl pyrrolidone, or polymers of alkylated pyrrolidone.

The invention relates also to liquid pesticidal emulsion compositions comprising
- (a) an aqueous continuous phase;
- (b) at least one colloidal solid which stabilizes the dispersed oil emulsion phase as described herein; and
- (c) a dispersed oil emulsion phase comprising
   - (i) at least one substantially water-insoluble pesticidally active ingredient, which is either itself an oily liquid comprising the oil phase, is a solid but is dissolved in an oily liquid present in the oil phase, is a solid and is dispersed within the oil phase or is present as a colloidal solid adsorbed to the liquid-liquid interface between the continuous aqueous phase and the dispersed oil phase; and
   - (ii) at least one Ostwald ripening inhibitor soluble or miscible in the oil phase or which itself serves as the oil phase.

The invention relates also to pesticide compositions obtained by diluting a liquid pesticidal emulsion composition comprising
- (a) an aqueous continuous phase;
- (b) at least one colloidal solid; and
- (c) a dispersed oil emulsion phase comprising
   - (i) at least one substantially water-insoluble pesticidally active ingredient, which is either itself an oily liquid comprising the oil phase, is a solid but is dissolved in an oily liquid present in the oil phase, is a solid and is dispersed within the oil phase or is present as a colloidal solid adsorbed to the liquid-liquid interface between the continuous aqueous phase and the dispersed oil phase; and
   - (ii) at least one Ostwald ripening inhibitor soluble or miscible in the oil phase or which itself serves as the oil phase, in a suitable carrier, such as water or liquid fertilizer, in an amount sufficient to obtain the desired final concentration of each of the active ingredients, for example, in an amount such that the final concentration of the pesticide(s) is between about 0.01% and about 10% of active ingredient (a.i.).

The invention relates also to a method for combating or preventing pests in crops of useful plants, said method comprising forming a liquid pesticidal emulsion composition comprising
- (a) an aqueous continuous phase;
- (b) at least one colloidal solid; and
- (c) a dispersed oil emulsion phase comprising
   - (i) at least one substantially water-insoluble pesticidally active ingredient, which is either itself an oily liquid comprising the oil phase, is a solid but is dissolved in an oily liquid present in the oil phase, is a solid and is dispersed within the oil phase or is present as a colloidal solid adsorbed to the liquid-liquid interface between the continuous aqueous phase and the dispersed oil phase; and
   - (ii) at least one Ostwald ripening inhibitor soluble or miscible in the oil phase or which itself serves as the oil phase, diluting the emulsion composition, if necessary, in a suitable carrier, such as water or liquid fertilizer, in an amount sufficient to obtain the desired final concentration of each of the active ingredients (a.i.) and treating the desired area, such as plants, the plant parts or the locus thereof, with said composition.

The term plants refers to all physical parts of a plant, including seeds, seedlings, saplings, roots, tubers, stems, stalks, foliage and fruits.

The composition according to the invention is suitable for all methods of application conventionally used in agriculture, e.g. pre-emergence application, post-emergence application and seed dressing. The compositions according to the invention are preferably used for pre- or post-emergence applications to crop areas.

The compositions according to the invention are suitable especially for combating and/or preventing pests in crops of useful plants. Preferred crops of useful plants include canola, cereals such as barley, oats, rye and wheat, cotton, maize, soya, sugar beets, fruits, berries, nuts, vegetables, flowers, trees, shrubs and turf. The components used in the composition of the invention can be applied in a variety of ways known to those skilled in the art, at various concentrations. The rate at which the compositions are applied will depend upon the particular type of pests to be controlled, the degree of control required, and the timing and method of application.

Crops are to be understood as also including those crops which have been rendered tolerant to herbicides or classes of herbicides (e.g. ALS-, GS-, EPSPS-, PPO-, ACCase and HPPD-inhibitors) by conventional methods of breeding or by genetic engineering. An example of a crop that has been rendered tolerant to imidazolinones, e.g. imazamox, by conventional methods of breeding is Clearfield® summer rape (canola). Examples of crops that have been rendered tolerant to herbicides by genetic engineering methods include e.g. glyphosate- and glufosinate-resistant maize varieties commercially available under the trade names RoundupReady® and LibertyLink®

Crops are also to be understood as being those which have been rendered resistant to harmful insects by genetic engineering methods, for example Bt maize (resistant to European corn borer), Bt cotton (resistant to cotton boll weevil) and also Bt potatoes (resistant to Colorado beetle). Examples of Bt maize are the Bt 176 maize hybrids of NK® (Syngenta Seeds). The Bt toxin is a protein that is formed naturally by *Bacillus thuringiensis* soil bacteria. Examples of toxins, or transgenic plants able to synthesise such toxins, are described in EP-A-451 878, EP-A-374 753, WO 93/07278, WO 95/34656, WO 03/052073 and EP-A-427 529. Examples of transgenic plants comprising one or more genes that code for an insecticidal resistance and express one or more toxins are KnockOut® (maize), Yield Gard® (maize), NuCOTIN33B® (cotton), Bollgard® (cotton), NewLeaf® (potatoes), NatureGard® and Protexcta®. Plant crops or seed material thereof can be both resistant to herbicides and, at the same time, resistant to insect feeding ("stacked" transgenic events). For example, seed can have the ability to express an insecticidal Cry3 protein while at the same time being tolerant to glyphosate.

Crops are also to be understood to include those which are obtained by conventional methods of breeding or genetic engineering and contain so-called output traits (e.g. improved storage stability, higher nutritional value and improved flavour).

Other useful plants include turf grass for example in golf-courses, lawns, parks and roadsides, or grown commercially for sod, and ornamental plants such as flowers or bushes.

Crop areas are areas of land on which the cultivated plants are already growing or in which the seeds of those cultivated plants have been sown, and also areas of land on which it is intended to grow those cultivated plants.

Other active ingredients such as herbicide, plant growth regulator, algaecide, fungicide, bactericide, viricide, insecticide, acaricide, nematicide or molluscicide may be present in the emulsion formulations of the present invention or may be added as a tank-mix partner with the emulsion formulations.

The compositions of the invention may further comprise other inert additives. Such additives include thickeners, flow enhancers, wetting agents, antifoaming agents, biocides, buffers, lubricants, fillers, drift control agents, deposition enhancers, adjuvants, evaporation retardants, freeze protecting agents, insect attracting odor agents, stabilizing metal salts or hydroxides, UV protecting agents, fragrances, and the like. The thickener may be a compound that is soluble or able to swell in water, such as, for example, polysaccharides of xanthans (e.g., anionic heteropolysaccharides), alginates, guars or celluloses such as RHODOPOL® 23 (Xanthan Gum) (Rhodia, Cranbury, N.J.); synthetic macromolecules, such as polyethylene glycols, polyvinyl pyrrolidones, polyvinyl alcohols, polycarboxylates, bentonites, montmorillonites, hectonites, or attapulgites. The freeze protecting agent may be, for example, ethylene glycol, propylene glycol, glycerol, diethylene glycol, saccharose, water-soluble salts such as sodium chloride, sorbitol, triethylene glycol, tetraethylene glycol, urea, or mixtures thereof. Representative anti-foam agents are silica, polydialkylsiloxanes, in particular polydimethylsiloxanes, fluoroaliphatic esters or perfluoroalkylphosphonic/perfluoroalkylphosphonic acids or the salts thereof and mixtures thereof. Preferred are polydimethylsiloxanes, such as Dow Corning® Antifoam A or Antifoam B. Representative biocides include 1,2-benzisothiazolin-3-one, available as PROXEL® GXL (Arch Chemicals).

Examples of suitable stabilizing metal salts and hydroxides that may be used include calcium, beryllium, barium, titanium, magnesium, manganese, zinc, iron, cobalt, nickel and copper salts and hydroxides; most suitable are magnesium, manganese, zinc, iron, cobalt, nickel and copper salts and hydroxides; especially preferred is copper hydroxide or a copper salt, for example, copper acetate.

The compositions of the invention may be mixed with fertilizers and still maintain their stability. For example, when the compositions of the invention are mixed with fertilizers, they do not exhibit any irreversible flocculation after about one hour and they show no tendency to coalescence. The fertilizers may comprise, for example, sulfur, nitrogen, phosphorous, and/or potassium. In one embodiment, the fertilizer may be 10-34-0 fertilizer.

The compositions of the invention may be used in conventional agricultural methods. For example, the compositions of the invention may be mixed with water and/or fertilizers and may be applied preemergence and/or postemergence to a desired locus by any means, such as airplane spray tanks, knapsack spray tanks, cattle dipping vats, farm equipment used in ground spraying (e.g., boom sprayers, hand sprayers), and the like. The desired locus may be soil, plants, and the like.

One embodiment of the present invention is directed to a method of treating building materials or hides, for example, in the leather tanning process, said method comprising coating or impregnating a building material or treating said hides with liquid, pesticidal emulsion compositions comprising (a) an aqueous continuous phase;
(b) at least one colloidal solid; and
(c) a dispersed oil emulsion phase comprising (i) at least one substantially water-insoluble pesticidally active ingredient, which is either itself an oily liquid comprising the oil phase, is a solid but is dissolved in an oily liquid present in the oil phase, is a solid and is dispersed within the oil phase or is present as a colloidal solid adsorbed to the liquid-liquid interface between the continuous aqueous phase and the dispersed oil phase; and
(ii) at least one Ostwald ripening inhibitor soluble or miscible in the oil phase or which itself serves as the oil phase.

The emulsion compositions of the invention can be diluted, if necessary, in a suitable carrier prior to coating or impregnating said building materials or treating said hides.

"Building material" as used herein means those materials used for construction and the like. In particular, building material includes wallboards, structural timber, doors, cupboards, storage units, carpets, particularly natural fibre carpets such as wool and hessian, soft furniture, wall or ceiling papers, and other surfaces such as painted walls, floors or ceilings, paints, plastics, wood (including engineered wood) and wood plastic composite. In addition to this, building material includes adhesives, sealants, joining materials and joints and insulation material. In a particular embodiment building materials means structural timber. In a further embodiment building materials means engineered wood. In a further embodiment building materials means plastic. Plastics includes plastic polymers and copolymers, including: acrylonitrile butadiene styrene, butyl rubber, epoxies, fluoropolymers, isoprene, nylons, polyethylene, polyurethane, polypropylene, polyvinyl chloride, polystyrene, polycarbonate, polyvinylidene fluoride, polyacrylate, polymethyl methacrylate, polyurethane, polybutylene, polybutylene terephthalate, polyether sulfone, polyphenyllenoxide, polyphenylene ether, polyphenylene sulfide, polyphtatamide, polysulphene, polyester, silicone, styrene butadiene rubber and combinations of polymers. In a further embodiment building material means polyvinyl chloride (PVC). In a further embodiment building material means polyurethane (PU). In a further embodiment building materials means paint. In a further embodiment building material means wood plastic composite (WPC). Wood plastic composite is a material that is well known in the art. A review of WPCs can be found in the following publication—Craig Clemons—Forrest Products Journal. June 2002 Vol 52. No. 6. pp 10-18.

"Wood" is to be understood as meaning wood and wood products, for example: derived timber products, lumber, plywood, chipboard, flakeboard, laminated beams, oriented strandboard, hardboard, and particleboard; paper food wrap, tropical wood, structural timber, wooden beams, railway sleepers, components of bridges, jetties, vehicles made of wood, boxes, pallets, containers, telegraph-poles, wooden fences, wooden lagging, windows and doors made of wood, plywood, chipboard, joinery, or wooden products which are used, quite generally, for building houses or decks, in building joinery or wood products that are generally used in house-building including engineered wood, construction and carpentry.

In one embodiment, the pesticidally active ingredient present in the discontinuous oil phase is selected from the group consisting of algaecide, fungicide, bactericide, viricide, insecticide, acaricide, nematicide or molluscicide and the emulsion compositions are used, optionally in diluted form, to coat or impregnate building materials.

The following examples illustrate further some of the aspects of the invention but are not intended to limit its scope. Where not otherwise specified throughout this specification and claims, percentages are by weight.

EXAMPLES

Various formulations are set forth below in Table 1. The pesticidally active ingredient(s) tested were S-metolachlor, glyphosate in the form of the potassium and the diammonium salts, benoxacor, propiconazole, prodiamine, mefenoxam and a herbicide of formula (I)

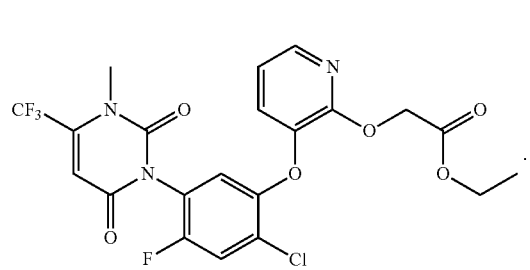

(I)

As the Ostwald ripening inhibitors, both polymeric stabilizers and Ostwald ripening inhibitor solvents were used. The Ostwald ripening inhibitors tested were Styron® 666D polystyrene available from Dow Chemical Company, Isopar™ V isoparaffinic solvent available from Exxon Mobil Chemical Company, polyisobutylene, a $C_{13-16}$ normal-paraffin and methyl oleate.

The colloidal solids tested were from the Aerosil® line of fumed silica or fumed mixed oxide products commercially available from Degussa Corporation.

Other components present in some of the formulations were: Sokalan® PA-30 polyacrylic acid dispersing agent available from BASF, Rhodasurf® BC-610 wetting agent which is a tridecyl alcohol ethoxylate available from Rhodia, Rhodopol 23 xanthan viscosity modifier available from Rhodia, Agnique PG8107-U C8-10 Alkyl Polyglycoside having an average degree of polymerization of 1.7 available from Cognis, Proxel® GXL biostat available from Avecia, Dow Corning® Antifoam A or Antifoam C silicone foam control agent and the balance being water.

TABLE 1

|  | A* | B | C* | D | E | F |
|---|---|---|---|---|---|---|
| S-metolachlor | 31.7% | 30.8% | 41.1% | 39.0% | 29.1% |  |
| K•glyphosate (ae) |  |  |  |  | 21.6% |  |
| (NH$_4$)$_2$•glyphosate (ae) |  |  |  |  |  | 2.5% |
| benoxacor | 1.6% | 1.5% |  |  |  |  |
| Propiconazole |  |  |  |  |  |  |
| Prodiamine |  |  |  |  |  | 0.12% |
| Mefenoxam |  |  |  |  |  |  |
| Diquat |  |  |  |  |  | 0.09% |
| Herbicide (I) |  |  |  |  |  |  |
| Styron 666D |  |  |  | 2.1% |  |  |
| Polyisobutylene |  |  |  |  |  |  |
| Isopar V |  | 1.0% |  |  | 0.91% | 0.51% |
| C1316 N-paraffin |  |  |  |  |  |  |
| Methyl oleate |  |  |  |  |  |  |
| Aerosil OX-50 |  |  |  |  | 1.1% |  |
| Aerosil 200 | 1.3% | 1.3% |  |  |  |  |
| Aerosil R974 |  |  | 2.9% | 3.0% |  |  |
| Aerosil 300 |  |  | 1.2% | 1.2% |  |  |
| Aerosil R816 |  |  |  |  |  | 0.08% |
| Aerosil COK84 |  |  |  |  |  |  |
| Sokalan PA-30 |  |  |  |  | 0.1% |  |
| Rhodasurf BC-610 |  |  |  |  |  | 0.003% |
| Rhodopol 23 |  |  |  |  | 0.12% | 0.15% |
| Agnique PG8107-U |  |  |  |  |  | 1.19% |
| Proxel GXL |  |  |  |  | 0.12% | 0.15% |
| Antifoam A |  |  |  |  |  | 0.01% |
| Antifoam C |  |  |  |  |  |  |
| Ammonium Sulfate |  |  |  |  |  |  |
| water | to 100% | to 100% | to 100% | to 100% | to 100% | to 100% |

|  | G | H | I | J |
|---|---|---|---|---|
| S-metolachlor |  |  |  |  |
| K•glyphosate (ae) | 30.1% |  |  |  |
| (NH$_4$)$_2$•glyphosate (ae) |  |  |  | 2.5% |
| benoxacor |  |  |  |  |
| Propiconazole |  |  | 19% |  |
| Prodiamine |  |  |  | 0.12% |
| Mefenoxam |  | 19% |  |  |
| Diquat |  |  |  | 0.09% |
| Herbicide (I) | 2.8% |  |  |  |
| Styron 666D |  |  |  |  |
| Polyisobutylene | 0.2% |  |  |  |
| Isopar V | 12.6% |  |  | 0.73% |
| C1316 N-paraffin |  |  | 1.0% |  |
| Methyl oleate |  | 1.0% |  |  |

TABLE 1-continued

| | | | | |
|---|---|---|---|---|
| Aerosil OX-50 | | | | 0.44% |
| Aerosil 200 | | | | |
| Aerosil R974 | | | | |
| Aerosil 300 | | | | |
| Aerosil R816 | 0.5% | | | |
| Aerosil COK84 | | 2.0% | 2.0% | |
| Sokalan PA-30 | | | | |
| Rhodasurf BC-610 | | | | 0.003% |
| Rhodopol 23 | 0.08% | 0.1% | 0.1% | 0.15% |
| Agnique PG8107-U | | | | |
| Proxel GXL | 0.08% | 0.1% | 0.1% | 0.15% |
| Antifoam A | | | | |
| Antifoam C | | | | 0.005% |
| Ammonium Sulphate | | | | 4.9% |
| water | to 100% | to 100% | to 100% | to 100% |

*Formulations outside of the scope of the present invention

Example 1

Pickering emulsion compositions A and B as shown above in Table 1 were prepared, these being identical except that the oil phase in composition B contains Isopar™ V at a level of 3 wt % as a percentage of the oil phase. The samples were prepared as follows: benoxacor was dissolved in S-metolachlor under agitation at about 60° C., Aerosil® 200 hydrophilic fumed silica was dispersed in tap water under high shear using a rotor-stator Turrax® mixer, the oil phase was then added to the aqueous phase and mixed at high shear again until the target droplet size was obtained. Initially composition A had a median droplet diameter (D(V,0.5)) of 6.5 microns and composition B had a mean diameter of 4.6 microns. After 4 weeks storage at 38° C., composition A had a median diameter of 8.5 microns whereas composition B had a median diameter of 5.0 microns—the increase of 0.4 microns is insignificant within the experimental method. These results show that the addition of Isopar™ V at the level shown inhibits Ostwald ripening.

Example 2

Pickering emulsion compositions C and D as shown above in Table 1 were prepared, these being substantially identical except that the oil phase in composition D contains Styron® 666D polystyrene at a level of 5 wt % as a percentage of the oil phase. The samples were prepared as follows: where necessary Styron® 666D was dissolved in S-metolachlor under agitation at about 60° C., Aerosil® 300 hydrophilic fumed silica was dispersed in tap water under gentle agitation, the oil phase was then added to the aqueous phase, this composition was then mixed under high shear using a rotor-stator Turrax® mixer for 1 to 2 minutes during which period the Aerosil® R974 hydrophobic fumed silica was added and shear was continued until the target droplet size was obtained. Initially composition C had a 95 percentile droplet diameter (D(V,0.95)) of 43.2 microns and composition D had a 95 percentile diameter of 45.0 microns. After 3 weeks storage at 50° C., composition C had a 95 percentile diameter of 97.2 microns whereas composition D had a 95 percentile diameter of 46.1 microns. These results show that the addition of Styron® 666D at the level shown inhibits Ostwald ripening.

Example 3

Pickering emulsion composition E as shown above in Table 1 was prepared as follows: Isopar™ V was mixed with S-metolachlor under gentle agitation, Aerosil® OX-50 hydrophilic fumed silica was dispersed in the solution of potassium glyphosate and half of the water under high shear using a rotor-stator Turrax®, the oil phase was then added to the aqueous phase and mixed at high shear again until the target droplet size was obtained, the remaining formulation components were then added and mixed until homogeneous. After 2 weeks storage under daily temperature cycling between −10° C. and 50° C., and also after 3 months storage at 38° C., the formulation shows only a trace (<1%) of clear serum formation, an unchanged homogeneous appearance, and remains a free-flowing liquid. These results show that these Pickering emulsions are stable in the presence of high electrolyte concentration, i.e., the glyphosate solution present in the aqueous phase, and have properties suitable for commercial use.

Example 4

Pickering emulsion composition F as shown above in Table 1 was prepared as follows: prodiamine crystals were added to water at 40 wt % along with the Rhodasurf BC-610 and milled using conventional equipment down to a median particle size of 0.6 microns, this dispersion was then stirred vigorously with the Isopar™ V such that all of the prodiamine was captured within the oil phase (confirmed by light microscopy on sub-samples diluted in water), the Aerosil® R816 surface modified fumed silica was dispersed in a solution containing half of the diammonium glyphosate under high shear using a rotor-stator Turrax®, the prodiamine-Isopar™ V dispersion was then added to the aqueous phase and mixed at high shear again until the target droplet size was obtained, the remaining formulation components were then added and mixed until homogeneous. The initial median droplet diameter (D(V,0.5)) was 4.6 microns. After 6 weeks storage at 38° C. the median diameter was 5.8 microns—the increase of 1.2 microns is not significant within the experimental method. This result shows that Pickering emulsions can be prepared with a solid active ingredient dispersed within a solvent that serves as an Ostwald ripening inhibitor, even when the external aqueous phase is of a high electrolyte concentration. Such formulations were stable to coalescence when stored at high temperature.

Example 5

Pickering emulsion composition G as shown above in table 1 was prepared as follows: polyisobutylene of molecular weight 850 kDa was dissolved at about 50° C. in 5% of the Isopar™ V, the herbicide of formula (I) was dispersed in the remainder of the Isopar™ V and milled using conventional methods, the two Isopar™ V portions were then combined under gentle agitation, the Aerosil® R816 surface modified fumed silica was dispersed in the water and the solution of potassium glyphosate under high shear using a rotor-stator Turrax®, the oil phase was added to the aqueous phase and was then mixed at high shear until the target droplet size was obtained, the Rhodopol 23 and Proxel GXL were added and mixed until homogeneous. When diluted into tap water in a graduated cylinder a finely dispersed emulsion was obtained. After overnight settling, a cream of emulsion had collected at the top of the cylinder but with only 1 or 2 inversions the cream was fully resuspended. After 4 months' storage at room temperature a small amount of clear serum formed at the bottom of the formulated product, but there was no sediment of active ingredient particles. These results show that Pickering emulsions can be prepared with a solid active ingredient dispersed within the oil phase and that although no surfactant or dispersant was present, such formulations have excellent redispersion characteristics in a medium used for diluting them prior to application, and that there is no tendency for the active ingredient to migrate into the continuous aqueous phase.

Example 6

Pickering emulsion composition H and I as shown above in Table 1 were prepared as follows: the Ostwald ripening inhibitor liquid (methyl oleate or $C_{13-16}$ normal paraffin as appropriate) was mixed with the active ingredient under gentle agitation at about 50° C., the Aerosil® COK84 hydrophilic fumed mixed oxide was dispersed in the tap water under high shear using a rotor-stator Turrax®, the oil phase was added to the aqueous phase, this mixture was warmed to approximately 50° C. to lower the viscosity of the oil phase and was then mixed at high shear until the target droplet size was obtained, the Rhodopol 23 and Proxel GXL were added and mixed until homogeneous. When diluted into standard 30-0-0 nitrogen fertilizer a fine emulsion dispersion was obtained, and after overnight storage no coalescence of the emulsion was observable. These results show that the Pickering emulsions have excellent stability to coalescence when diluted into high electrolyte concentrations, and this makes them highly suitable for use in agriculture where fertilizer solutions often form the dilution medium for spray application. After storage for 26 days at 50° C. the formulation of composition I had a volume median diameter of 15.3 microns, insignificantly different from its initial value of 15.8 microns. These results show that a normal paraffin liquid can serve as an Ostwald ripening inhibitor.

Example 7

Pickering emulsion composition J as shown above in Table 1 was prepared as follows: prodiamine crystals were added to water at 40 wt % along with the Rhodasurf BC-610 and milled using conventional equipment down to a median particle size of 0.6 microns, this dispersion was then stirred vigorously with the Isopar™ V such that all of the prodiamine was captured within the oil phase (confirmed by light microscopy on sub-samples diluted in water), the Aerosil® OX50 fumed silica was dispersed in a solution containing half of the diammonium glyphosate under high shear using a rotor-stator Turrax®, the prodiamine-Isopar™ V dispersion was then added to the aqueous phase and mixed at high shear again until the target droplet size was obtained, the remaining formulation components were then added and mixed until homogeneous. The initial median droplet diameter (D(V,0.5)) was 10 microns. After 1 month storage at 50° C. the median diameter was 12 microns—the increase of 2 microns is not significant within the experimental method. This result shows that Pickering emulsions can be prepared with a solid active ingredient dispersed within a solvent that serves as an Ostwald ripening inhibitor, even when the external aqueous phase is of a high electrolyte concentration, and in the absence of any surfactant at a level that could serve as an emulsifier. Such formulations were stable to coalescence when stored at high temperature.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

I claim:

1. A liquid pesticidal emulsion composition comprising
(a) an aqueous continuous phase;
(b) at least one colloidal solid selected from carbon black, metal oxides, metal hydroxides, metal carbonates, metal sulfates, silica, and clays, and wherein said at least one colloidal solid does not comprise a polymer; and
(c) a dispersed oil emulsion phase comprising
  (i) a pesticidally effective amount of a pesticidally active ingredient selected from metolachlor, acetochlor, and S-metolachlor; and
  (ii) at least one Ostwald ripening inhibitor selected from an iso-paraffin fluid, and wherein said Ostwald ripening inhibitor functions to inhibit Ostwald ripening, and wherein if the composition further comprises an additional emulsifier the composition comprises less than 0.5 weight % of the additional emulsifier.

2. The liquid pesticidal composition of claim 1 wherein the pesticidally active ingredient is dissolved in a solvent.

3. The liquid pesticidal composition of claim 1, wherein the aqueous phase contains at least one water-soluble agrochemical.

4. The liquid pesticidal composition of claim 3, wherein the at least one water-soluble agrochemical is selected from the group consisting dicamba, glyphosate, or mixtures thereof and agriculturally acceptable salts thereof.

5. The liquid pesticidal composition of claim 4, wherein the water-soluble agrochemical comprises at least one glyphosate salt selected from the group consisting of monosodium, monopotassium, diammonium, mono(dimethylammonium), mono(ethanolammonium), mono (isopropylammonium) and mono(trimethylsulfonium) salts.

6. The liquid pesticidal composition of claim 1, wherein the acetamide comprises mixtures of metolachlor (S) and (R) isomers wherein the ratio of of (S)-2-chloro-N-(2-ethyl-6-methylphenyl)-N-(2-methoxy-1-methylethyl)acetamide to (R)-2-chloro-N-(2-ethyl-6-methylphenyl)-N-(2-methoxy-1-methylethyl)acetamide is in the range of from 50-100% to 50-0%.

7. The liquid pesticidal composition of claim 1 wherein the composition is entirely free of an additional emulsifier.

8. A liquid composition obtained by diluting the pesticidal composition of claim 5 in a suitable carrier in an amount sufficient to obtain the desired final concentration of each of the active ingredients.

9. A method for combating pests in crops of plants, said method comprising:
applying a liquid pesticidal emulsion, or a dilution of the liquid pesticidal emulsion in a suitable carrier in an amount sufficient to obtain the desired final concentration of a pesticidally active ingredient, to a pest, the soil of a plant, a plant part, or a locus thereof, wherein said liquid pesticidal emulsion comprises:
(a) an aqueous continuous phase comprising glyphosate;
(b) at least one colloidal solid selected from carbon black, metal oxides, metal hydroxides, metal carbonates, metal sulfates, silica, and clays, and wherein said at least one colloidal solid does not comprise a polymer;
(c) a dispersed oil emulsion phase comprising
(i) a pesticidally effective amount of a pesticidally active ingredient selected from metolachlor, acetochlor, or S-metolachlor; and
(ii) at least one Ostwald ripening inhibitor selected from an iso-paraffin fluid, and wherein said Ostwald ripening inhibitor functions to inhibit Ostwald ripening, and wherein if the composition further comprises an additional emulsifier, the composition comprises less than 0.5 weight % of the additional emulsifier.

10. The method of combating pests in crops of plants according to claim 9, wherein the crops have been made tolerant to at least one of the pesticidally active ingredients as a result of conventional methods of breeding or genetic engineering.

11. The method of claim 10, wherein the crops are tolerant to acetolactate synthase (ALS) inhibitors, glutamine synthetase (GS) inhibitors, 5-enolpyruvylshikimate-3-phosphate synthase (EPSPS) inhibitors, protoporphyrinogen oxidase (PPO) inhibitors, acetyl CoA carboxylase (ACCase) inhibitors and/or 4-hydroxyphenyl-pyruvate-dioxygenase (HPPD) inhibitors and wherein the crops are treated post-emergence with said pesticidal compositions.

12. The method of claim 11, wherein the crops are tolerant to glypho sate and are selected from the group consisting of canola, cereals, cotton, maize, rice, soybeans and sugar beets.

13. The liquid pesticidal composition of claim 5, wherein the colloidal solid is silica, the pesticidally active ingredient is S-metolachlor, and the at least one water-soluble agrochemical is glyphosate.

14. The liquid pesticidal composition of claim 13, wherein the colloidal solid is fumed silica and the at least one water-soluble agrochemical is monopotassium glyphosate.

15. The method of claim 9, wherein the colloidal solid is silica and the pesticidally active ingredient is S-metolachlor.

16. The method of claim 15, wherein the colloidal solid is fumed silica and the glyphosate is monopotassium glyphosate.

* * * * *